ns)

(12) United States Patent
Sekino et al.

(10) Patent No.: US 10,596,937 B2
(45) Date of Patent: Mar. 24, 2020

(54) INTERIOR PART OF VEHICLE AND MANUFACTURING METHOD THEREOF

(71) Applicant: TACHI-S CO., LTD., Akishima-shi, Tokyo (JP)

(72) Inventors: Hiroshi Sekino, Tokyo (JP); Yukihito Kobayashi, Tokyo (JP); Satoshi Tadokoro, Tokyo (JP); Meimei Lai, Tokyo (JP); Takuya Hori, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 246 days.

(21) Appl. No.: 15/217,869

(22) Filed: Jul. 22, 2016

(65) Prior Publication Data

US 2017/0028937 A1 Feb. 2, 2017

(30) Foreign Application Priority Data

Jul. 27, 2015 (JP) .................................. 2015-147610

(51) Int. Cl.
*B60N 2/58* (2006.01)
*B60N 2/70* (2006.01)
*D05B 1/00* (2006.01)
*B60R 13/02* (2006.01)

(52) U.S. Cl.
CPC ............. *B60N 2/58* (2013.01); *B60N 2/5891* (2013.01); *B60N 2/7017* (2013.01); *D05B 1/00* (2013.01); *B60R 2013/0293* (2013.01)

(58) Field of Classification Search
CPC ...... B60N 2/70; B60N 2/7011; B60N 2/7017; B60N 2/58; B60N 2/5891; B60N 2/5883; B60R 2013/0293; B60R 2013/018; D05B 1/00; D05B 15/00; D05B 35/10

USPC ............. 112/16, 117, 147, 153, 439, 470.27, 112/475.06
See application file for complete search history.

(56) References Cited

U.S. PATENT DOCUMENTS 5,016,941 A * 5/1991 Yokota ................. B60N 2/5875
297/452.61
5,341,755 A * 8/1994 Kawasaki ............... D05B 33/00
112/163
5,395,473 A * 3/1995 Nixon ..................... B29C 63/22
156/285

(Continued)

FOREIGN PATENT DOCUMENTS

FR 2609703 A1 * 7/1988 ......... B29D 99/0092
JP 01164620 A * 6/1989 ........... B60N 2/7017

(Continued)

OTHER PUBLICATIONS

Office Action, dated Jul. 30, 2019, in Japanese Patent Application No. 2015-147610.

*Primary Examiner* — Ryan D Kwiecinski
(74) *Attorney, Agent, or Firm* — SGPatents PLLC

(57) ABSTRACT

An interior part of vehicle capable of improving in design property is manufactured by joining a plurality of pieces of a layered cloth having at least a skin material and a cushion material. The plurality of pieces to be joined are processed with continuous stitches, and the pieces joined with the stitch processing are sewn up, with the front surfaces put together, along ends to be joined. One of the joined plurality of pieces is folded, thus the plurality of pieces are provided, with the front surfaces facing vehicle interior space.

5 Claims, 13 Drawing Sheets

(56) References Cited

U.S. PATENT DOCUMENTS

| | | | | |
|---|---|---|---|---|
| 5,501,165 A * | 3/1996 | Nagashima | ............ | D05B 35/08 |
| | | | | 112/475.06 |
| 5,669,670 A * | 9/1997 | Haraguchi | ............ | B29C 44/141 |
| | | | | 297/219.1 |
| 6,116,175 A * | 9/2000 | Ito | ............ | A41D 27/24 |
| | | | | 112/475.06 |
| 6,886,479 B1 * | 5/2005 | Hori | ............ | B60N 2/5883 |
| | | | | 112/470.27 |
| 8,191,218 B2 * | 6/2012 | Dooley | ............ | B60N 2/58 |
| | | | | 29/91.1 |
| 8,783,768 B2 * | 7/2014 | Severinski | ............ | B60N 2/5891 |
| | | | | 297/218.1 |
| 9,296,354 B1 * | 3/2016 | Preisler | ............ | B60R 21/215 |
| 2003/0098113 A1 * | 5/2003 | Takei | ............ | B29C 44/143 |
| | | | | 156/79 |
| 2003/0168151 A1 * | 9/2003 | Wright | ............ | B29C 65/62 |
| | | | | 156/93 |
| 2011/0030596 A1 * | 2/2011 | Boinais | ............ | B60N 2/58 |
| | | | | 112/402 |
| 2012/0313391 A1 * | 12/2012 | Kornylo | ............ | B60N 2/5883 |
| | | | | 296/1.08 |
| 2013/0305974 A1 * | 11/2013 | Ishii | ............ | D05B 23/00 |
| | | | | 112/475.08 |
| 2015/0001205 A1 * | 1/2015 | Tada | ............ | H05B 3/342 |
| | | | | 219/529 |
| 2016/0317047 A1 | 11/2016 | Sugiyama | | |
| 2016/0339819 A1 * | 11/2016 | Shindo | ............ | B68G 7/05 |
| 2016/0368405 A1 * | 12/2016 | Ishii | ............ | B60N 2/5891 |
| 2016/0375807 A1 * | 12/2016 | Kageyama | ............ | B60N 2/5883 |
| | | | | 297/452.61 |
| 2017/0210261 A1 * | 7/2017 | Ishii | ............ | B60N 2/58 |

FOREIGN PATENT DOCUMENTS

| | | | |
|---|---|---|---|
| JP | H8-266764 A | 10/1996 | |
| JP | 2001-269493 A | 10/2001 | |
| JP | 2015-123359 A | 7/2015 | |

* cited by examiner

F I G. 2
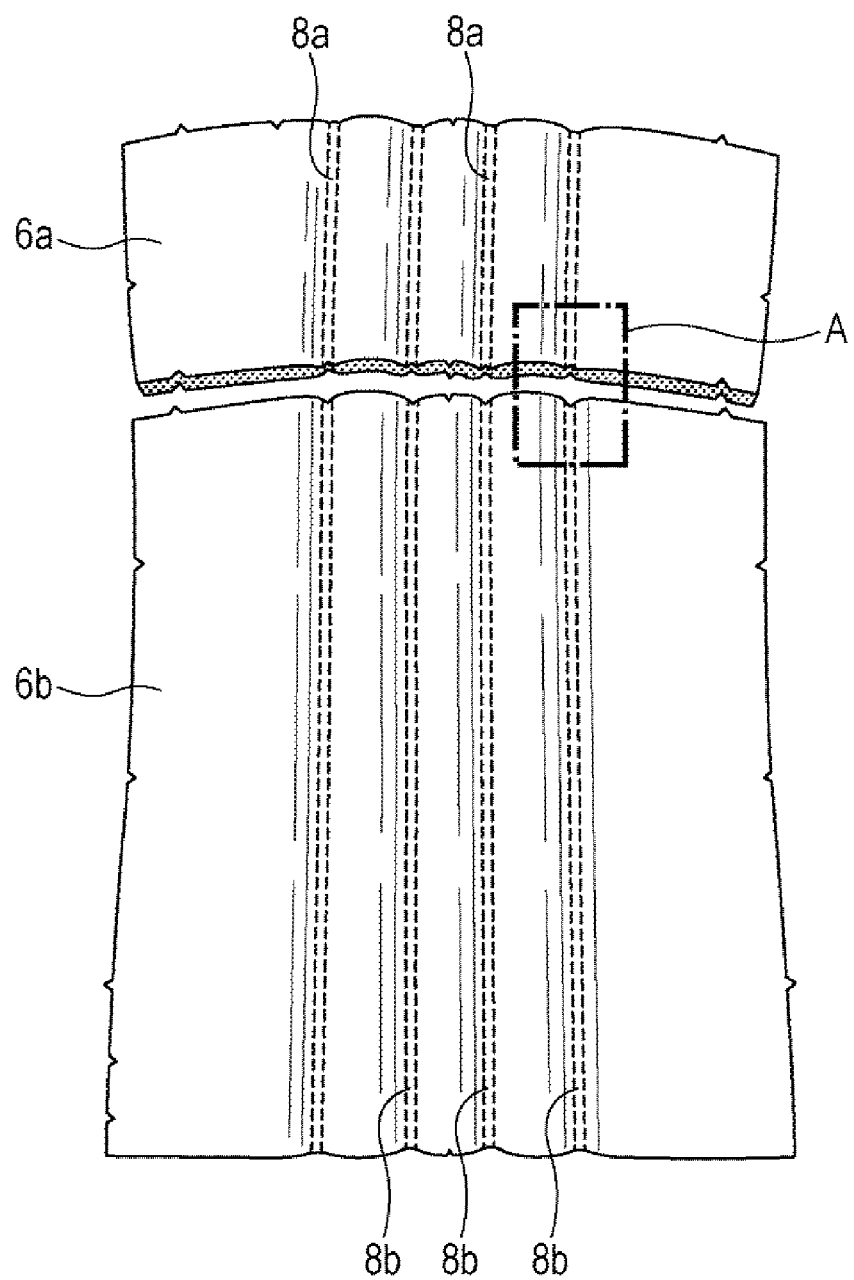

F I G. 3
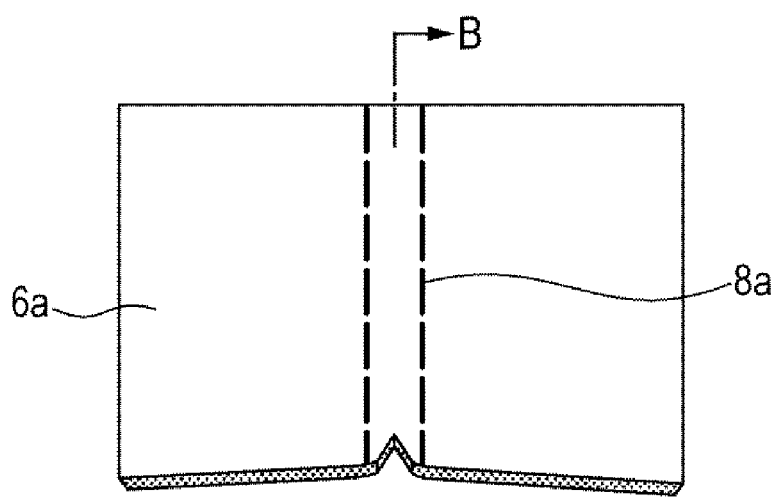
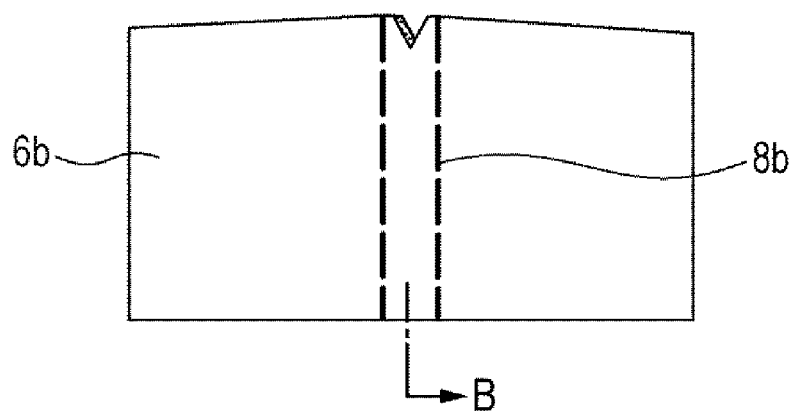

F I G. 4
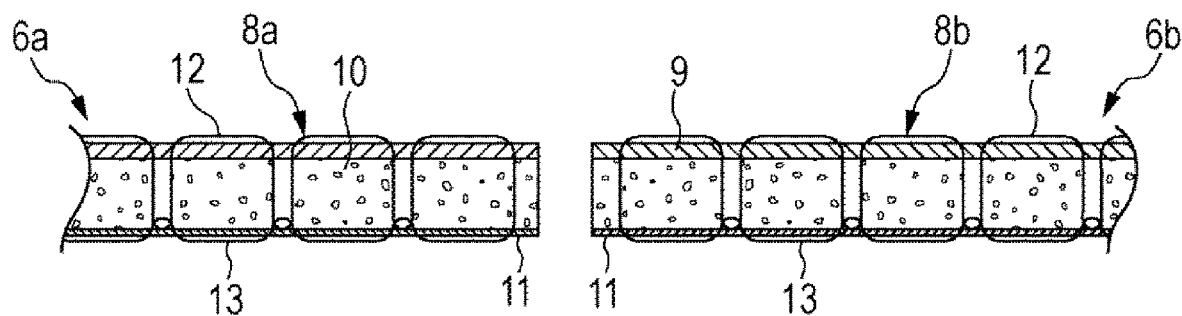
F I G. 5
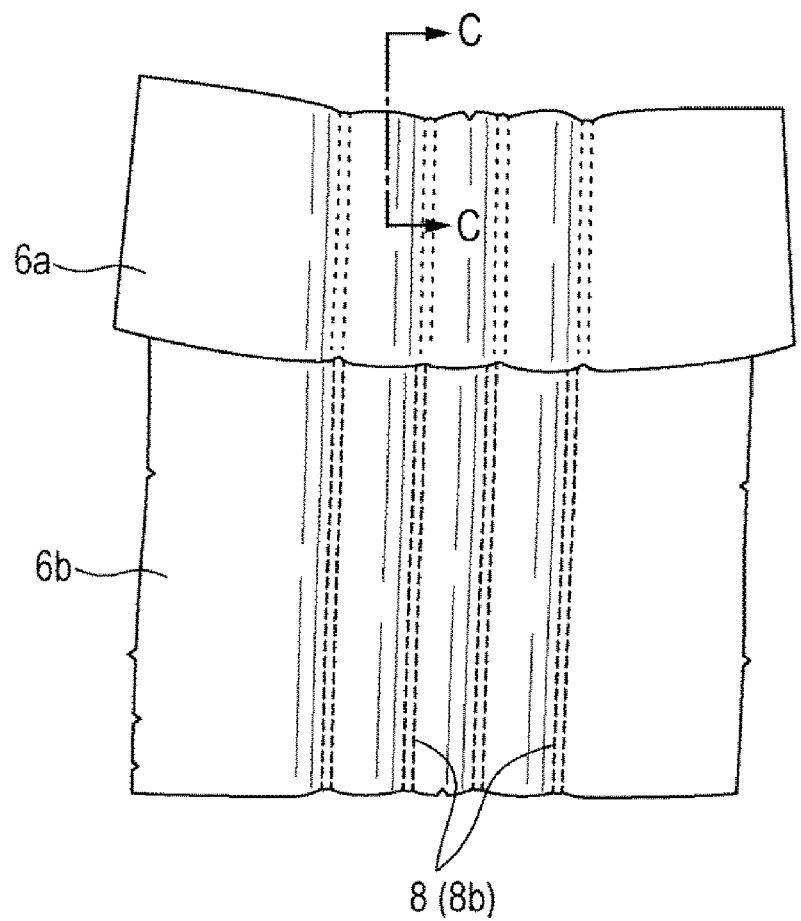

F I G. 8
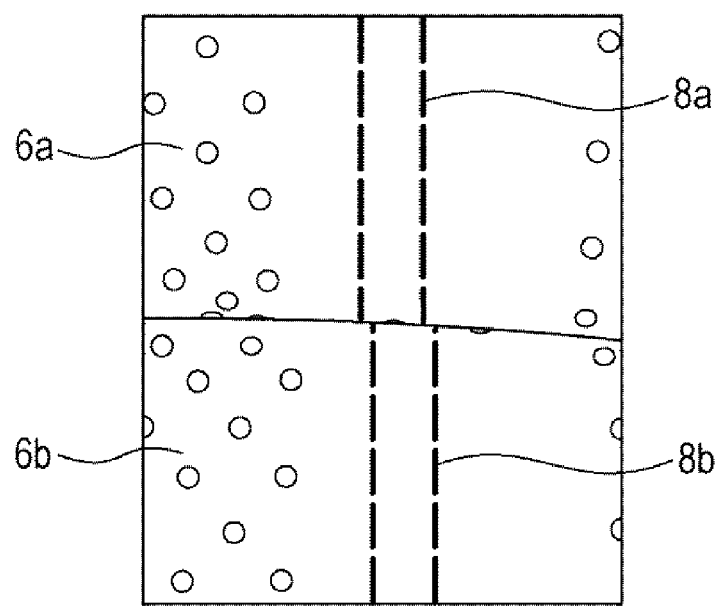

F I G. 1 2
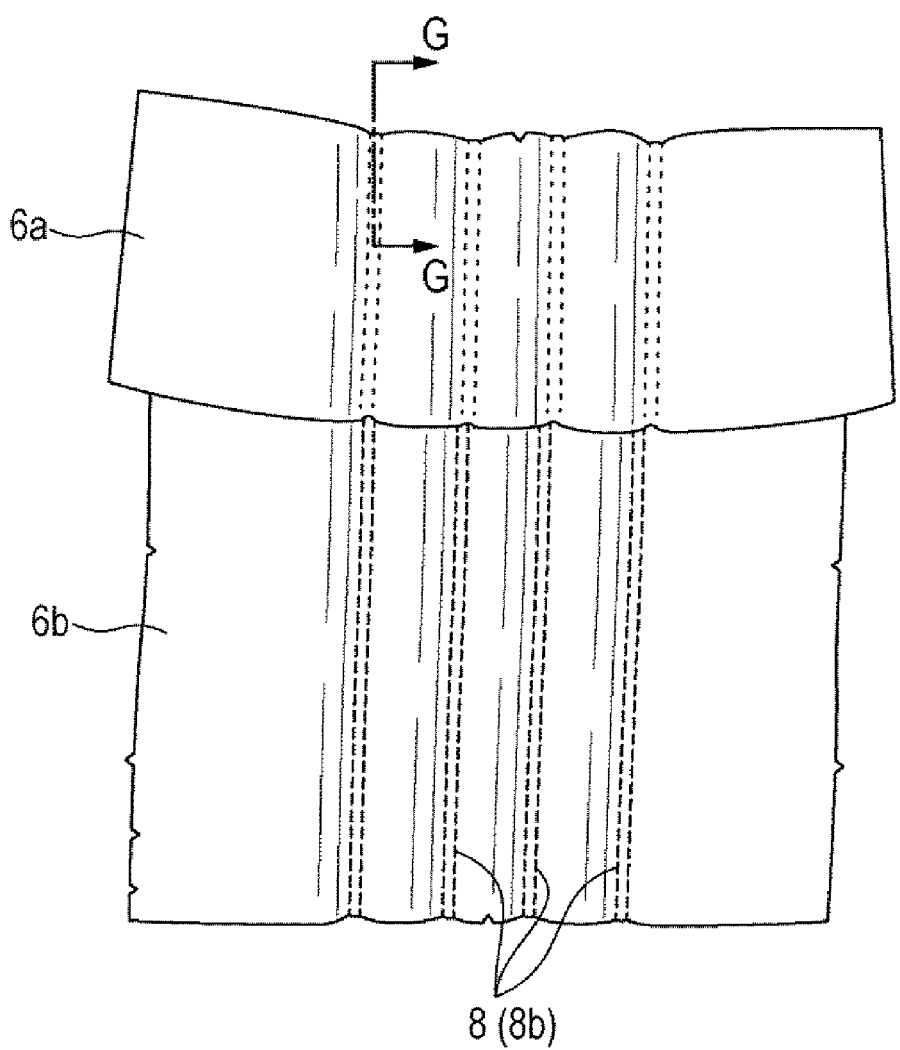

F I G. 1 3
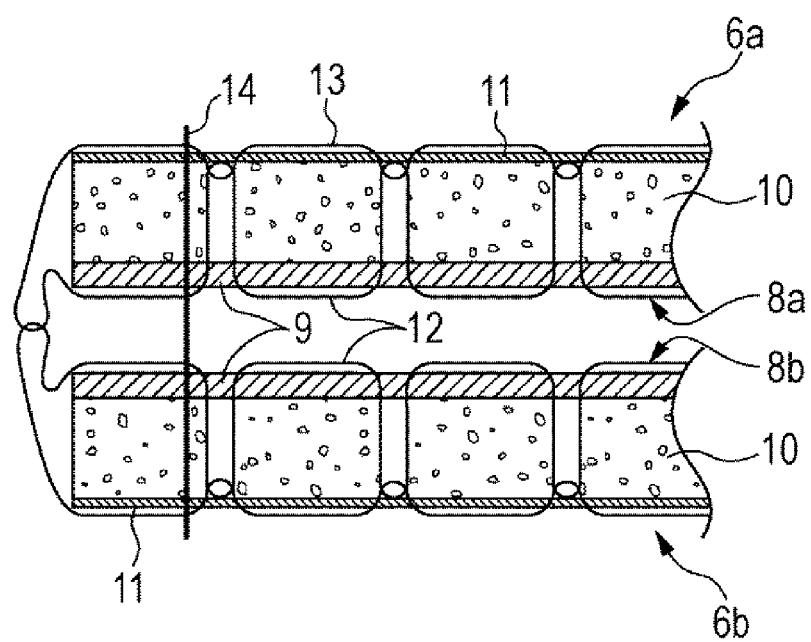

F I G. 1 4
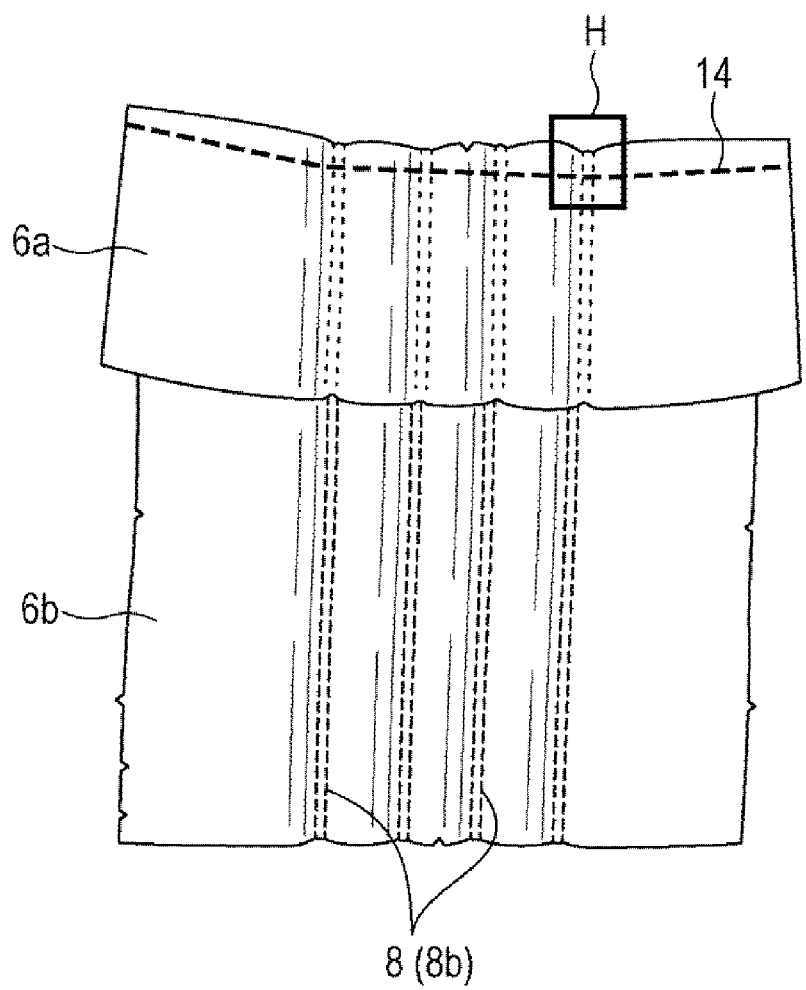

F I G. 1 5
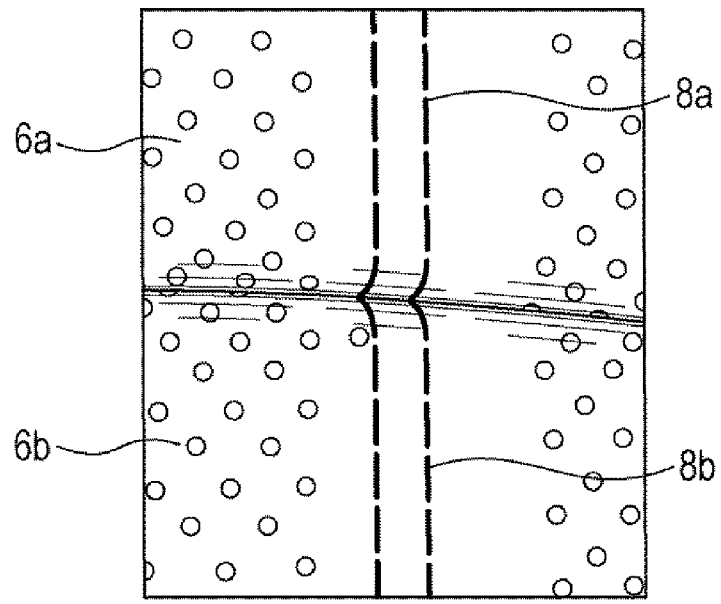

INTERIOR PART OF VEHICLE AND MANUFACTURING METHOD THEREOF

INCORPORATION BY REFERENCE

The present application claims priority from Japanese application serial No. 2015-147610, filed on Jul. 27, 2015, the entire contents of which are hereby incorporated by reference into this application.

BACKGROUND

The present invention relates to an interior part of vehicle such as a vehicle seat and a manufacturing method of the interior part.

Regarding a vehicle seat such as an automobile seat, various functions such as safety, holding property, sitting comfort, and vibration absorption performance are required. At the same time, as the seat is a large part among the interior parts of automobile, various requirements regarding outer appearance and design property are made of the seat. Especially, a trim cover of the vehicle seat significantly influences the design property of the vehicle seat.

The trim cover of the vehicle seat is manufactured by combining plural cloths (trim cover pieces) forming the trim cover and sewing them. Japanese Published Unexamined Patent Application No. Hei 8-266764 discloses this type of technique.

According to Japanese Published Unexamined Patent Application No. Hei 8-266764, plural clothes forming the trim cover, used in a seatback of a vehicle seat, are joined three-dimensionally, so as to be fitted to the outer contour of a foam-made cushion body covered with the trim cover.

Further, according to this publication, in joining of terminals of the plural cloths when the terminal of one cloth to be joined to another cloth is cut in an arc projecting curve while the end of the other cloth to be joined with the end of the former cloth is cut in a straight line, an operator feeds the both ends in a sewing machine while aligning them.

Further, according to this publication, a stretch sewing material (cloth) having a terminal in a projecting or recess curve, to be joined with another terminal, is expanded or contracted on a jig such that the terminal is fixed in a straight line, then the other sewing material (cloth) is overlaid on the former sewing material, and they are integrally sewn and joined with the sewing machine.

The trim cover is often quilting-stitched from the light of design and sitting comfort. For example, a trim cover used in a seatback or seat cushion of a vehicle seat is manufactured by an operator's feeding both of plural quilting-stitched clothes i.e. pieces of the trim cover into a sewing machine while manually aligning them, thus sewing up the ends of the pieces.

However, upon this sewing up, a stitch pattern on one piece is often shifted from that on the other cloth. That is, the sewing up of plural cloths is performed while the opposite sides to the stitch patterns (the sides where the stitch patterns are unshown) are faced up. Accordingly, it is extremely difficult for even a skilled sewing-machine operator to perform sewing up while accurately align the stitch patterns. Especially in the case of thick quilting material, the degree of difficulty in sewing is high and variation in the sewing result occurs by product. Thus the design property is impaired.

SUMMARY

The present invention provides an interior part of vehicle and a manufacturing method of the interior part of vehicle which enable improvement in design property.

To attain the above object, according to one aspect of the present invention, provided is an interior part of vehicle, comprising a plurality of pieces of a layered cloth including at least a skin material and a cushion material which are manufactured by joining, wherein a continuous stitch is processed on the plurality of pieces to be joined, and wherein, the plurality of pieces, joined with stitch processing, are sewn up along ends to be joined, with the front surfaces of the plurality of pieces put together, and one of the joined plurality of pieces is folded, and then the plurality of pieces are provided with front surfaces facing vehicle inner space.

According to another aspect of the present invention, the present invention provides a manufacturing method of interior part of vehicle, including the steps of: arraying ends of a plurality of pieces of a layered cloth including at least a skin material and a cushion material to be joined close to each other; continuously performing stitch processing with respect to the plurality of pieces to be joined; putting front surfaces of the plurality of pieces joined with the stitch processing together, and sewing up the plurality of pieces along ends to be joined; and folding one of the joined plurality of pieces, so as to provide the plurality of pieces, with the front surfaces facing vehicle inner space.

According to the present invention, it is possible to provide an interior part of vehicle and a manufacturing method of the interior part of vehicle which enable improvement in design property.

These features and advantages of the invention will be apparent from the following more particular description of preferred embodiments of the invention, as illustrated in the accompanying drawings.

BRIEF DESCRIPTION OF THE DRAWINGS

The above and other object, features and advantages of the present invention will become more apparent from the following detailed description when taken in conjunction with the accompanying drawings wherein:

FIG. 2 is a plan view explaining a conventional manufacturing method of a seatback part of a trim cover;

FIG. 3 is an enlarged view of a part A in FIG. 2;

FIG. 4 is a cross-sectional view along a line B-B in FIG. 3;

FIG. 5 illustrates a status where front surfaces of two pieces forming the seatback part are put together, and ends of the pieces to be sewn up are aligned, from the status of FIG. 2;

FIG. 8 is an enlarged view of a part D in FIG. 7 showing a status where the front side of a piece 6a is folded to the front from the status in FIG. 7;

FIG. 12 illustrates a status where the front surfaces of the two pieces forming the seat back part are put together, and the ends to be sewn up are aligned, from the status in FIG. 9;

FIG. 13 is a cross-sectional view along a line G-G in FIG. 12;

FIG. 14 illustrates a status where the two pieces are sewn up from the status in FIG. 12;

FIG. 15 is an enlarged view of a part H in FIG. 14 showing a status where the front side of the piece 6a is folded to the front from the status in FIG. 14.

DESCRIPTION OF THE PREFERRED EMBODIMENTS

Figure 1:
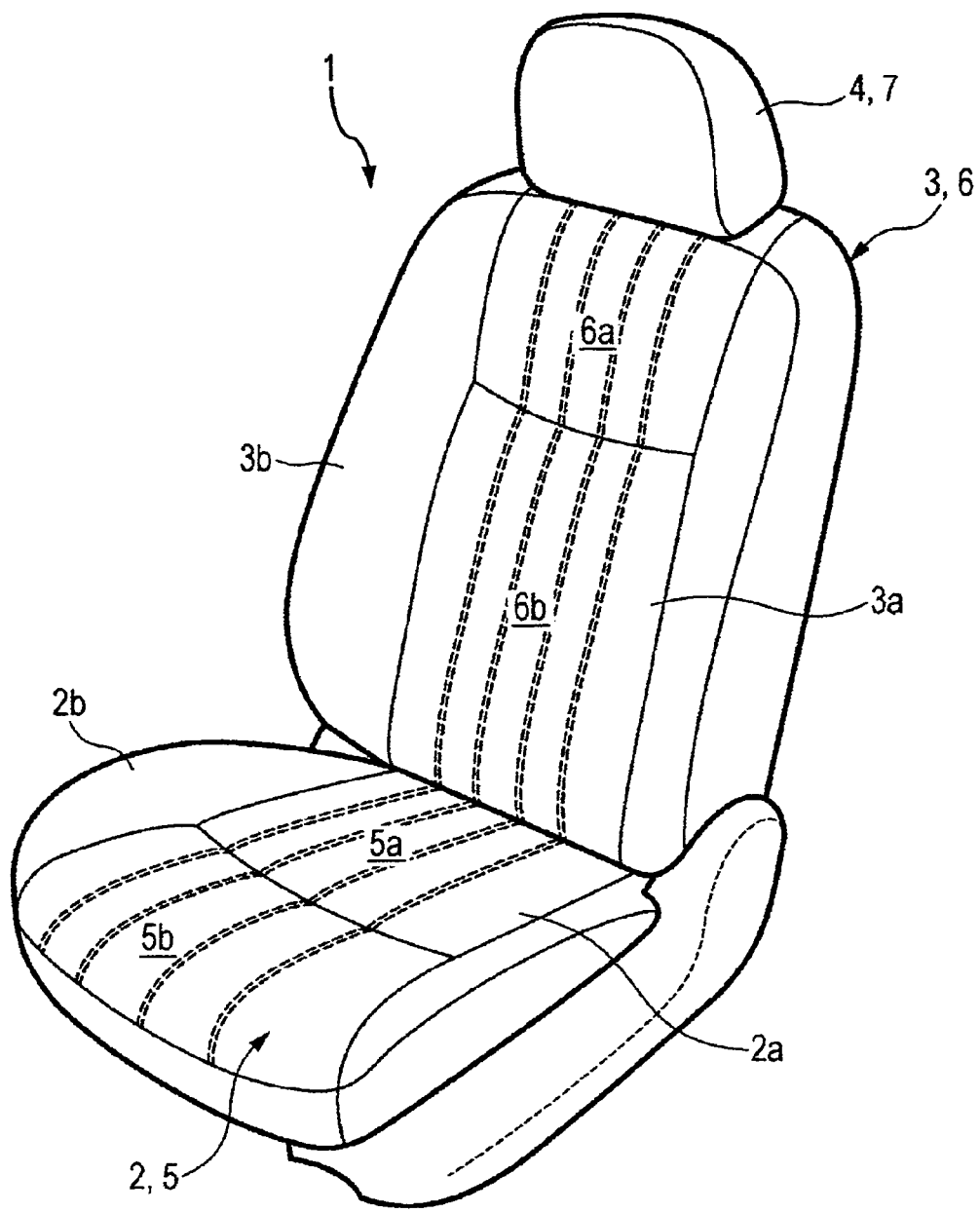
FIG. 1 is an overall perspective view of a vehicle seat as an interior part of vehicle according to a first embodiment of the present invention.

Hereinbelow, a particular embodiment of an interior part of vehicle and a manufacturing method of the interior part according to the present invention will be described using the drawings. In the respective figures, the elements having the same reference numerals are the same or corresponding elements.

First Embodiment

An example where a first embodiment of the interior part of vehicle and the manufacturing method of the interior part according to the present invention is applied to a vehicle seat used as an interior part of vehicle in an automobile will be described.

FIG. 1 is an overall perspective view of the vehicle seat as an interior part of vehicle, according to the first embodiment of the interior part of vehicle of the present invention.

As shown in FIG. 1, a vehicle seat 1 has a seat cushion 2 as a seat part of the vehicle seat, a seatback 3 as a backrest of the seat, and a headrest 4 for protection of a vehicle occupant's head and neck.

The seat cushion 2 has a seat part 2a at its center and a side support part 2b as a support for a side part of the seat part 2a. The seatback 3 also has a seatback part 3a at its center and a side support part 3b as a support for its side part. Further, the seat cushion 2, the seatback 3 and the headrest 4 are covered with trim covers 5 to 7.

In the example shown in FIG. 1, quilting-stitch is applied to the surfaces of the trim covers 5 and 6 of the seat cushion 2 and the seatback 3 in the light of design property and sitting comfort. In this example, two parallel straight lines are drawn by the quilting stitch, however, a grid pattern or the like is frequently made. Various quilting stitch patterns are provided as three-dimensional patterns by forming plural convexoconcave irregularity parts on the surface of the cloth using a computer sewing machine or multi-needle sewing machine.

Further, in the example shown in FIG. 1, the trim cover 5 corresponding to the seat part 2a of the seat cushion 2 is manufactured by joining two pieces 5a and 5b. Similarly, the trim cover 6 corresponding to the seatback part 3a of the seatback 3 is manufactured by joining two pieces 6a and 6b. These trim covers are manufactured by this way for emphasis on the convexoconcave irregularity in the trim cover and for improvement in the design property and sitting comfort.

As the trim covers covering the seat cushion 2 and the seatback 3, a cloth including three layers of, from the surface side, a skin material, wadding as a cushion material, and back base fabric, is used. As a material of the wadding [8], e.g. an urethane material having a high cushioning property is used. Accordingly, it is possible to emphasize the convexoconcave irregularity in the trim cover and improve the design property and sitting comfort by applying quilting stitch to the trim cover or manufacturing the trim cover by joining plural pieces.

Further, by manufacturing the trim cover with plural pieces, it is possible to effectively utilize raw material (e.g. leather) of the skin material forming the trim cover, to improve the yield.

Next, the sewing method of the plural pieces 6a and 6b, forming the seatback part 3a of the quilting-stitched trim covers 5 and 6, will be described using FIGS. 2 to 16. Note that since the sewing method of the plural pieces 5a and 5b forming the seat part 2a is the same as the above method, the sewing of the pieces 5a and 5b will be omitted.

First, a conventional sewing method will be described using FIGS. 2 to 8.

Figure 6:
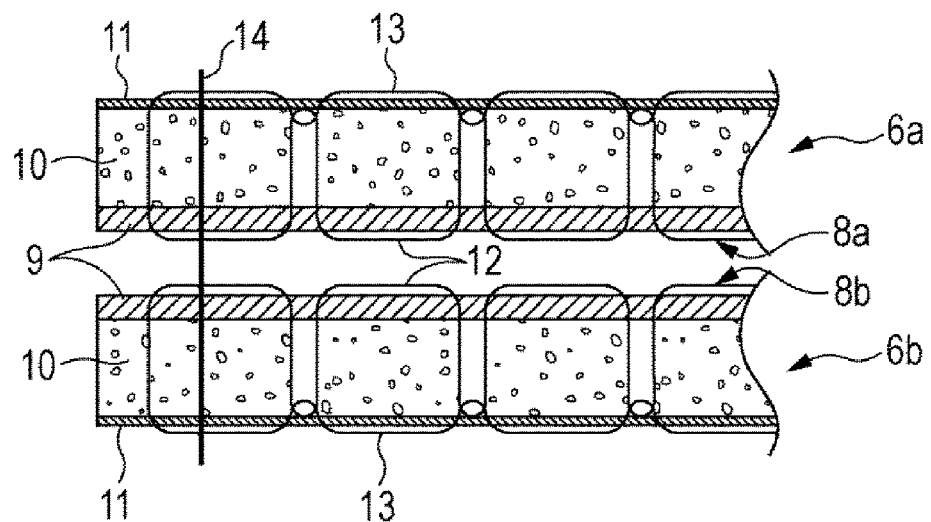
FIG. 6 is a cross-sectional view along a line C-C in FIG. 5.
Figure 7:
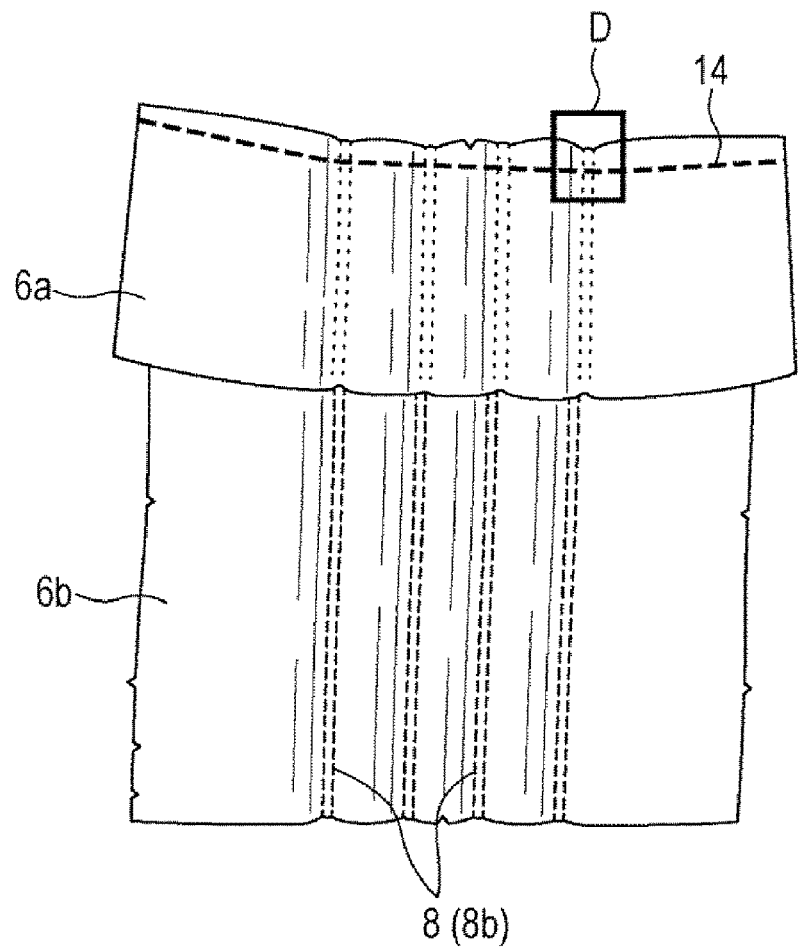
FIG. 7 illustrates a status where the two pieces are sewn up from the status in FIG. 5.

FIG. 2 is a plan view explaining the conventional manufacturing method of a seatback part of a trim cover. FIG. 3 is an enlarged view of a part A in FIG. 2. FIG. 4 is a cross-sectional view along a line B-B in FIG. 3. FIG. 5 illustrates a status where front surfaces of two pieces of the seatback part are put together, and ends of the pieces to be sewn up are aligned, from the status of FIG. 2. FIG. 6 is a cross-sectional view along a line C-C in FIG. 5. FIG. 7 illustrates a status where the two pieces are sewn up from the status in FIG. 5. FIG. 8 is an enlarged view of a part D in FIG. 7 showing a status where the front side of a piece 6a is folded to the front, from the status in FIG. 7.

FIG. 2 illustrates a status before the pieces 6a and 6b are sewn up. The pieces 6a and 6b are cut in correspondence with the shape of the seatback part 3a. Further, as described above, as the pieces 6a and 6b, a cloth including three layers of a skin material, wadding as a cushion material and a back base fabric, is used. The piece 6a formed with this three-layer cloth is processed with a quilting stitch 8a, and similarly, the piece 6b is processed with a quilting stitch 8b, with a stitching yarn. With these quilting stiches 8b and 8b, a three-dimensional pattern is formed on the surface of the skin material 9.

Note that the quilting stitches 8a and 8b are processed with the same pattern stitch and the intervals between the respective stitches are the same such that the patterns are continuous when the two pieces are joined.

As shown in FIG. 3 as an enlarged view of the part A in FIG. 2, and as shown in FIG. 4 as a cross-sectional view along the line B-B in FIG. 3, the pieces 6a and 6b respectively have a three layer structure of a skin material 9, wadding 10 as a cushion material, and back base fabric 11. Further, the pieces 6a and 6b are processed with the quilting stitches 8a and 8b. Reference numerals 12 and 13 denote a stitching yarn forming the quilting stitches 8a and 8b. Numeral 12 denotes an upper thread; and 13, a bobbin thread.

FIG. 5 shows a status where front surfaces of the two pieces 6a and 6b forming the seatback part 3a are put together, and ends of the pieces to be sewn up are aligned, from the status of FIG. 2. That is, the piece 6b is arranged with its front side (the skin material 9 side) faced up, while the piece 6a, with its back side (back base fabric 11 side) faced up. The ends of the pieces 6a and 6b to be sewn up are aligned.

FIG. 6 is an enlarged cross-sectional view along a line C-C in FIG. 5. FIG. 5 shows a status before the two pieces 6a and 6b are sewn up. As shown in the cross-sectional view of FIG. 6, in this status where the front surfaces (the surfaces on the skin material 9 side) of the pieces 6a and 6b are facing each other and the ends of the two pieces 6a and 6b are aligned, the pieces are sewn up in position indicated with numeral 14 along the ends to be joined. That is, as shown in FIG. 7, the pieces 6a and 6b are sewn up along the ends to be joined, from one end side of the pieces 6a and 6b to the other end side, as indicated with the sewing line 14.

FIG. 8 is an enlarged view of the part D in FIG. 7 showing a status where the front side of the piece 6a is folded to the front from the status in FIG. 7 where the two pieces are sewn up. As shown in FIG. 6, the two pieces 6a and 6b, with the quilting stitches 8a and 8b facing each other are sewn up as shown in FIG. 7. Accordingly, they are sewn up while the quilting stitches 8a and 8b are not seen. It is extremely difficult even for an operator skilled in machine sewing to sew up the thick quilting clothes, with stitch patterns on the respective clothes, i.e. the quilting stitches 8a and 8b, not shifted but accurately aligned. As shown in FIG. 8, in the conventional art, there is a problem that the quilting stitches 8a and 8b are shifted from each other and variation occurs by product, which impairs the design property.

Next, a first embodiment of the present invention to solve the problem will be described below using FIGS. 9 to 16.

Figure 9:
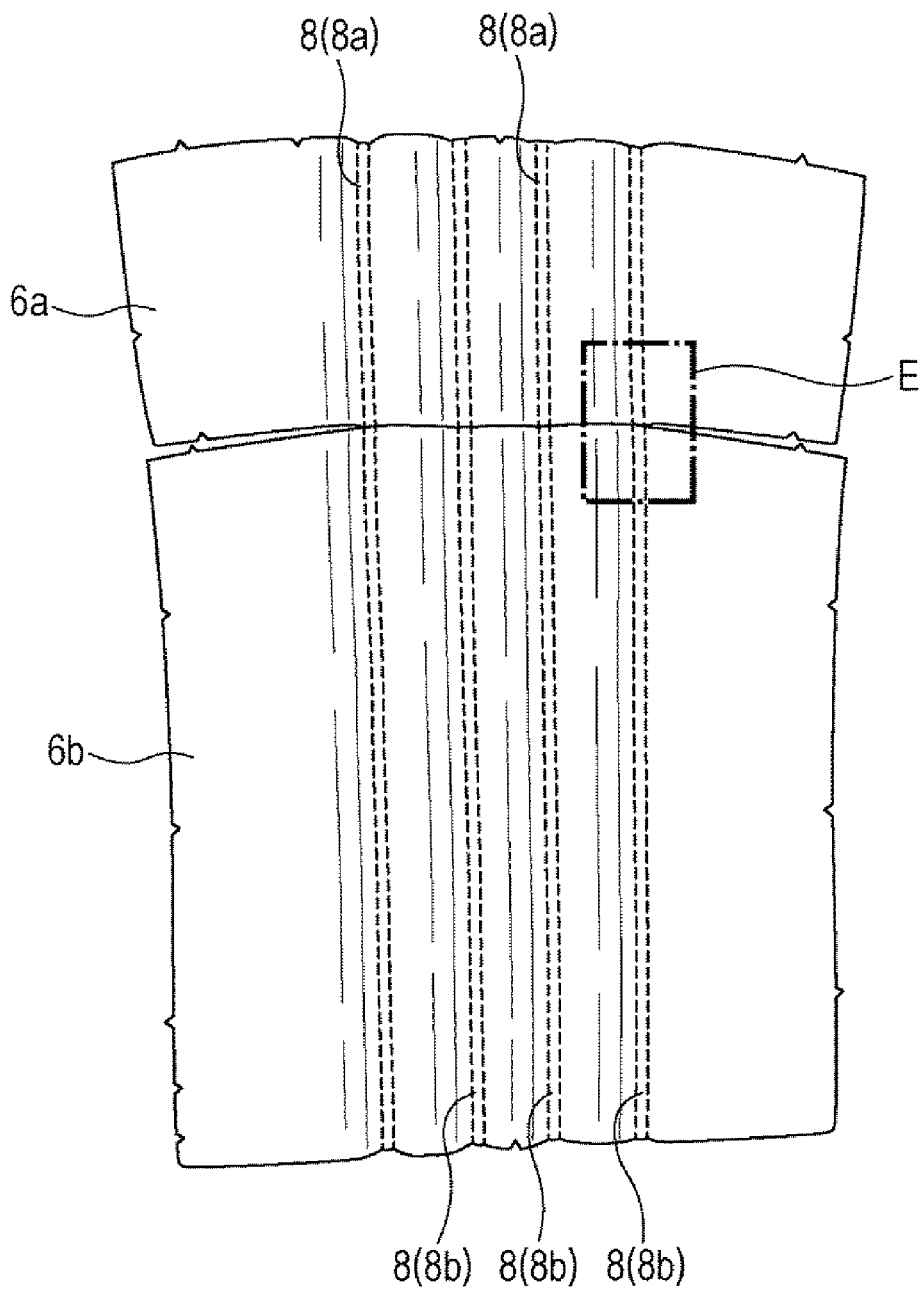
FIG. 9 is a plane view explaining a manufacturing method of the seat back part of the trim cover shown in FIG. 1 according to the first embodiment.
Figure 10:
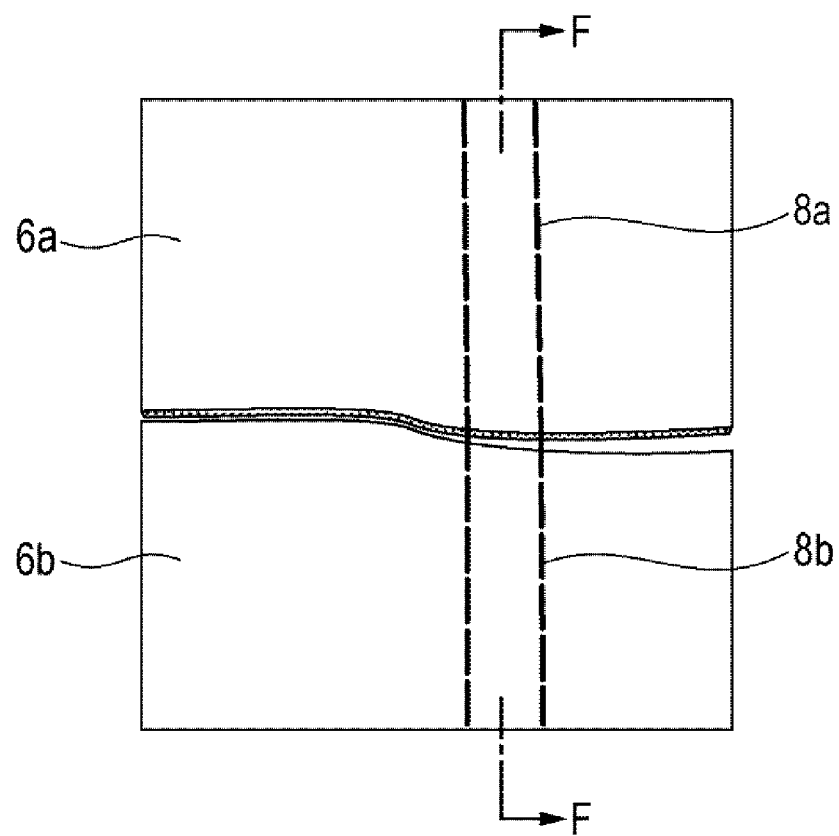
FIG. 10 is an enlarged view of a part E in FIG. 9.
Figure 11:
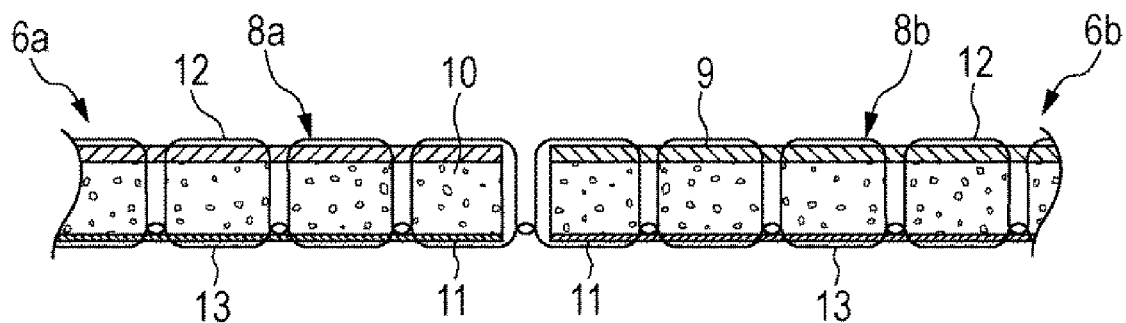
FIG. 11 is a cross-sectional view along a line F-F in FIG. 10.
Figure 16:
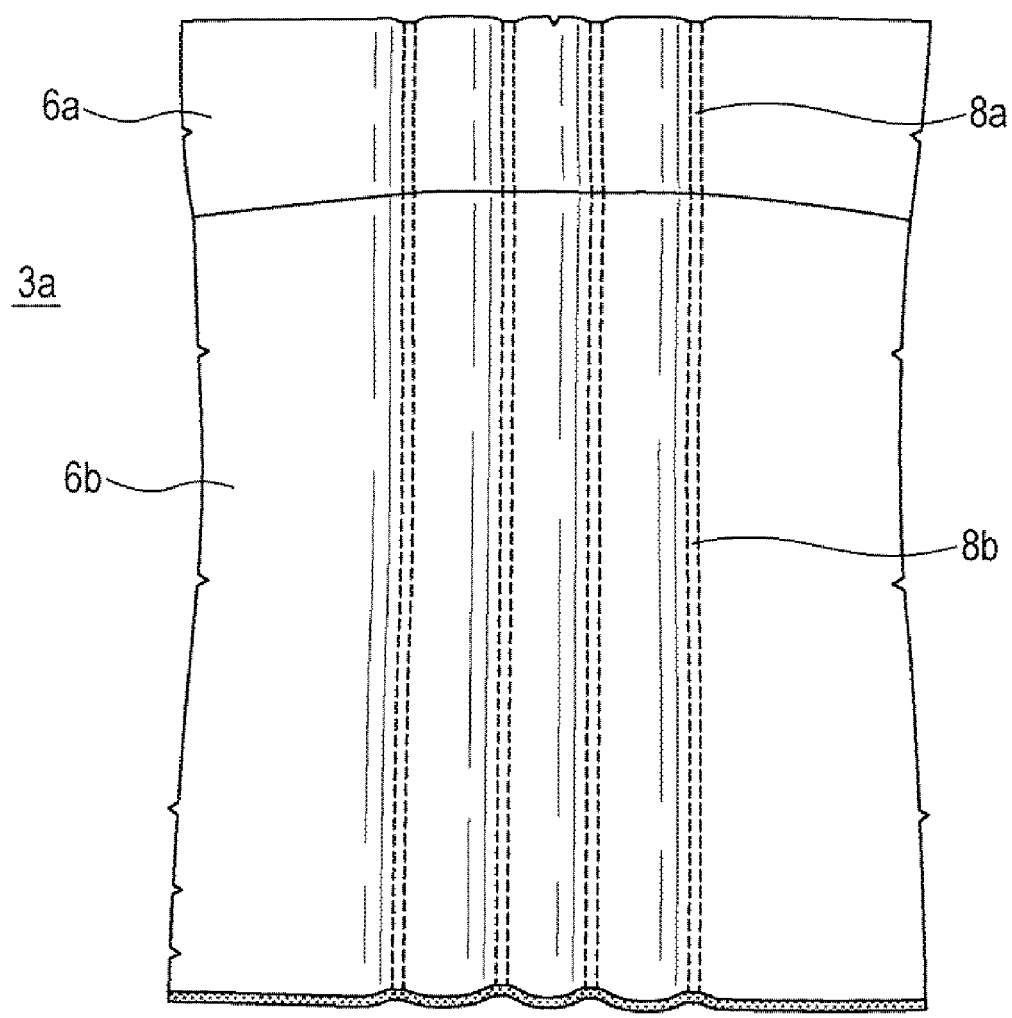
FIG. 16 is a plan view of the seatback part of the trim cover manufactured in the first embodiment of the present invention.

FIG. 9 is a plane view explaining a manufacturing method of the seat back part of the trim cover shown in FIG. 1. FIG. 10 is an enlarged view of a part E in FIG. 9. FIG. 11 is a cross-sectional view along a line F-F in FIG. 10. FIG. 12 illustrates a status where the front surfaces of the two pieces forming the seat back part are put together, and the ends to be sewn up are aligned from the status in FIG. 9. FIG. 13 is a cross-sectional view along a line G-G in FIG. 12. FIG. 14 illustrates a status where the two pieces are sewn up from the status in FIG. 12. FIG. 15 is an enlarged view of a part H in FIG. 14 showing a status where the front side of the piece 6a is folded to the front from the status in FIG. 14. FIG. 16 is a plan view of the seatback part of the trim cover manufactured in the first embodiment of the present invention.

In the present embodiment, first, the pieces 6a and 6b of the trim cover 6 forming the seatback part 3a are cut in correspondence with the shape of the seatback part 3a. As in the case of the conventional art, the pieces 6a and 6b are formed with a cloth including three layers of the skin material 9, the wadding 10 as a cushion material, and the back base fabric 11. From this status, as shown in FIG. 9, the ends of the pieces 6a and 6b to be joined are arrayed close to each other, and stitching process is continuously performed with a sewing machine with respect to the pieces 6a and 6b to be joined.

FIG. 9 shows a status where the quilting stitch 8 (8a and 8b) is continuously applied with a stitching yarn to the pieces 6a and 6b formed with the cloth including three layers. In FIG. 9, the quilting stitch 8 processed with two parallel pattern stitches is processed to form four lines. The respective quilting stitches 8 are continuously processed over the pieces 6a and 6b. The pieces 6a and 6b are connected with the stitching yarns. Further, by the quilting stitch processing, a three-dimensional pattern is formed on the surface of the skin material 9.

FIG. 10 shows an enlarged view of a part E in FIG. 9. FIG. 11 is a cross-sectional view along a line F-F in FIG. 10. As shown in FIG. 11, the pieces 6a and 6b respectively have a three layer structure of the skin material 9, the wadding 10, and the back base fabric 11. Further, as shown in FIGS. 10 and 11, the pieces 6a and 6b are joined with the processed quilting stitch 8 (8a and 8b). That is, the pieces 6a and 6b are connected with the stitching yarn (the upper thread 12 and the bobbin thread 13) forming the quilting stitch 8.

FIG. 12 illustrates a status where the front surfaces of the two pieces 6a and 6b forming the seat back part 3a are put together, and the ends to be sewn up are aligned, from the status in FIG. 9. That is, the piece 6b is arranged with its front side (the skin material 9 side) faced up, while the piece 6a, with its back side (back base fabric 11 side) faced up. The ends of the pieces 6a and 6b to be sewn up are aligned.

FIG. 13 is an enlarged cross-sectional view along a line G-G in FIG. 12. FIG. 12 illustrates the status before the pieces 6a and 6b are sewn up. As shown in the cross-sectional view of FIG. 13, in this status, the pieces 6a and 6b are arranged with the front surfaces (the surfaces on the skin material 9 side) facing each other, and the ends of the two pieces 6a and 6b are aligned. In this status, the aligned ends of the pieces 6a and 6b are connected with the stitching yarn of the quilting stitch 8 (8a and 8b). From this status, the pieces are sewn up in position indicated with numeral 14 along the ends to be joined. That is, as shown in FIG. 14, the pieces 6a and 6b are sewn up from one end side to the other end side, as indicated with the sewing line 14.

FIG. 15 is an enlarged view of a part H in FIG. 14 showing a status where the front side of the piece 6a (the skin material 9 side) is folded to the front from the status in FIG. 14. As shown in FIG. 15, according to the present embodiment, it is possible to sew up the pieces, with the quilting stitches 8a and 8b not shifted but accurately aligned, and to improve the design property.

The advantage of the above sewing is explained on the following ground. As shown in FIG. 13, in the present embodiment, the two pieces 6a and 6b are also sewn up, with the quilting stitches 8a and 8b facing each other, as shown in FIG. 14, and the pieces are sewn up while the quilting stitches 8a and 8b are not seen, as in the case of the above-described conventional art. However, in the present embodiment, the pieces 6a and 6b are connected by stitch processing, then the surfaces to be the front side of the pieces are faced each other, then the pieces are sewn up along the ends to be joined. Accordingly, it is easily possible to sew up the thick quilting clothes, with stitch patterns on the respective clothes, i.e. the quilting stitches 8a and 8b, not shifted but accurately aligned.

FIG. 16 is a plan view of the seatback part of the trim cover manufactured in the first embodiment of the present invention. As shown in FIG. 16, according to the present embodiment, it is possible to sew up the pieces with the quilting stitches 8a and 8b accurately aligned. Further, it is possible for even an operator not skilled in machine sewing to manufacture a product (trim cover as an interior part of vehicle in the present embodiment) excellent in design property while suppress the occurrence of variation by product.

In the above-described first embodiment, the present invention is applied to production of the seatback part 3a of the trim cover formed with two pieces. The present invention is similarly applicable to production of a seatback part of a trim cover formed with three pieces. It is possible to sew up the three pieces, with the quilting stitches not shifted but accurately aligned, thus manufacture a three-piece seatback part excellent in design property.

Further, the present invention is similarly applicable to a seatback part 3a of a trim cover formed with four or more pieces.

Further, the present invention is similarly applicable to any sewing as long as stitch processing is performed. For example, the invention is applicable to sewing of the piece forming the side support part 3*b* and the piece forming the seatback part 3*a* of the trim cover 6, or sewing of the trim cover 5 of the seat cushion 2 or sewing of the trim cover 7 of the headrest 4.

Further, the present invention is similarly applicable to, in addition to the trim covers 5 to 7 of the vehicle seat 1, other interior part of vehicle such as a door trim, sealing, or a steering wheel, in the vehicle, as long as it is manufactured by combining plural pieces, performing stitch processing and sewing up the pieces. The present invention is particularly effective when using a quilting material.

According to the present invention, as described above, it is easily possible to sew up plural pieces, with quilting stitches over the pieces not shifted but accurately aligned. Further, it is possible to manufacture a trim cover or interior part of vehicle, divided into plural or a large number of pieces, by combining the pieces, performing quilting stitch processing and sewing with respect to the pieces. Accordingly, it is possible to reduce wasted portion and to efficiently utilize raw material such as leather. It is possible to improve the yield of the raw material such as leather.

Note that the present invention is not limited to the above embodiment, but various modifications can be made. Further, the embodiment has been described in detail for clearly explaining the present invention and the invention is not limited to an embodiment having all the constituent elements.

The invention may be embodied in other specific forms without departing from the spirit or essential characteristics thereof. The present embodiment is therefore to be considered in all respects as illustrative and not restrictive, the scope of the invention being indicated by the appended claims, rather than by the foregoing description, and all changes which come within the meaning and range of equivalency of the claims are therefore intended to be embraced therein.

The invention claimed is:

1. A method of manufacturing an interior part of a vehicle, the method comprising:
    (a) disposing first ends of a plurality of separate pieces of layered cloth adjacent to each other, each of the pieces including at least a skin material and a cushion material, the skin materials of the separate pieces of layered cloth facing in a same direction;
    (b) forming at least one continuous stitch on the skin materials and extending between the adjacent first ends of the plurality of pieces of layered cloth so as to join the separate pieces together;
    (c) after (b), disposing the plurality of pieces of layered cloth joined by the at least one continuous stitch such that the respective skin materials of the plurality of pieces face each other and such that the respective first ends are aligned, and sewing the plurality of pieces of layered cloth together along a sewing line adjacent to said aligned first ends; and
    (d) after (c), folding one of the joined plurality of pieces of layered cloth with respect to the sewing line such that portions of the respective skin materials of each of the plurality of pieces of layered cloth face an inner space of the vehicle.

2. The method of manufacturing the interior part of the vehicle according to claim 1, wherein the layered cloth is formed by overlaying at least the skin material, the cushion material, and a back base fabric.

3. The method of manufacturing the interior part of the vehicle according to claim 2,
    wherein the interior part of the vehicle forms at least a part of a trim cover forming a surface of a vehicle seat, and
    wherein, after (d), the plurality of pieces stitch processed and sewn together form a quilted material.

4. The method of manufacturing the interior part of the vehicle according to claim 1,
    wherein the interior part of the vehicle forms at least a part of a trim cover forming a surface of a vehicle seat, and
    wherein, after (d), the plurality of pieces stitch processed and sewn together form a quilted material.

5. The method of manufacturing the interior part of the vehicle according to claim 1, wherein, in (c), the sewing line crosses a direction in which the at least one continuous stitch extends.

* * * * *